United States Patent [19]

Brosius et al.

[11] 4,411,340
[45] Oct. 25, 1983

[54] HYDRODYNAMIC BRAKES

[75] Inventors: Klaus Brosius, Heidenheim-Mergelstetten; Berthold Herrmann, Heidenheim, both of Fed. Rep. of Germany

[73] Assignee: Voith Getriebe KG, Fed. Rep. of Germany

[21] Appl. No.: 435,874

[22] Filed: Oct. 21, 1982

Related U.S. Application Data

[63] Continuation of Ser. No. 165,388, Jul. 3, 1980, abandoned.

[30] Foreign Application Priority Data

Jul. 7, 1979 [DE] Fed. Rep. of Germany ....... 2927582

[51] Int. Cl.³ ............................................. F16D 57/02
[52] U.S. Cl. ..................................... 188/296; 60/353; 192/3.23
[58] Field of Search .................... 188/296, 290, 264 E; 192/3.21, 3.23, 4 B, 12 A; 60/332, 333, 334, 337, 352, 353

[56] References Cited

U.S. PATENT DOCUMENTS 3,399,747 9/1968 Westwell et al. ................... 188/296
4,194,600 3/1980 Armasow et al. ................... 188/296

FOREIGN PATENT DOCUMENTS 1942475 3/1971 Fed. Rep. of Germany ...... 188/296
2016711 10/1971 Fed. Rep. of Germany ...... 188/296
2135268 1/1973 Fed. Rep. of Germany ...... 188/296
2605229 10/1976 Fed. Rep. of Germany ...... 188/296
1499704 9/1967 France .
221741 10/1968 U.S.S.R. ............................ 188/296

Primary Examiner—George E. A. Halvosa
Attorney, Agent, or Firm—Ostrolenk, Faber, Gerb & Soffen

[57] ABSTRACT

A hydrodynamic brake is disclosed of a kind comprising a rotor bucket wheel and a stator bucket wheel in a housing and defining a torus-shaped working chamber and defining between them a bucket wheel gap. An outlet duct surrounds the perimeter of the rotor bucket wheel. A plurality of baffle type flow obstructions are provided about the periphery of the bucket wheel gap, and are movable into the bucket wheel gap and when the brake is not engaged. A small gap between the radially outermost part of the rotor bucket wheel and the housing is continuous with the outlet duct. A second duct connects the outlet duct and the space in which the baffle type flow obstructions are accommodated, thereby preventing unwanted movement of the flow obstructions into the bucket wheel gap while the brake is engaged.

3 Claims, 3 Drawing Figures

HYDRODYNAMIC BRAKES

This is a continuation of application Ser. No. 165,388, filed July 3, 1980, now abandoned.

BACKGROUND OF THE INVENTION

The present invention is concerned with a hydrodynamic brake of the kind comprising a rotor bucket wheel and a stator bucket wheel which together form a torus-shaped working chamber which can be filled with working fluid, and between which there is located a bucket wheel gap which is arranged at least approximately perpendicular to the axis of the rotor bucket wheel. Such a brake also includes a casing which is attached to the stator bucket wheel and which encompasses the rotor bucket wheel. The casing has an annular outlet duct extending around the rotor bucket wheel.

Baffle-type flow obstructions are arranged in an accommodating space extending along the outer circumference of the bucket wheels and are able to move around the circumference of the bucket wheel gap in such a way that they can be disengaged when the brake is disengaged. In addition to the bucket wheel gap, an additional gap is provided between the greatest external diameter of the rotor bucket wheel and the casing, and this defines the annular outlet duct.

A similar brake is known from German Laid-open Patent Specification No. 19 42 475. However, in this known brake, there is no gap adjacent to and surrounding the perimeter of the bucket wheel gap to define the annular outlet duct, which duct is also the accommodating space for the baffle-type flow obstructions.

In the brake of the kind to which the invention pertains, that part of the casing which defines the outermost circumference of the annular outlet duct has a relatively small clear diameter. This means that this part of the casing, together with the outer circumference of the rotor bucket wheel, forms a narrow gap immediately adjacent to and surrounding the perimeter of the bucket wheel gap. In this way a reduction in the weight of the casing is reduced. At the same time, the filling volume of the brake is reduced and with it the filling time. As a result, a quicker braking response is obtained. The bucket wheel gap is substantially sealed off from the annular outlet duct, facilitating the achievement of an orderly flow. The accommodating space for the plate-type baffles in this embodiment is also reduced to a gap-type annular space which is generally located between a flange secured to the stator bucket wheel and a flange secured to the casing. The engagement and disengagement of the baffles are generally effected with the aid of a pressure medium adjustment cylinder.

In a brake of this kind, it has been observed, among other things that the baffles accidentally become engaged in the working chamber, against the force exerted by the adjustment cylinder, when the brakes are engaged. This reduces the braking effect to an unacceptable extent.

It is believed that the accidental engagement of the baffles is caused by the occasional extremely high flow speed attained by the working fluid in passing through the radially outermost region of the working chamber from the bucket ducts of the rotor into the bucket ducts of the stator. It is certain that the high flow speed greatly reduces the static pressure set up in the bucket wheel gap, and in the extreme case, reduces the pressure to virtually zero. Furthermore, it is assumed that a small part of the flow of working fluid penetrates into the space provided to accommodate the baffles, and that in the radially outermost region of this accommodating space, the flow energy is converted to static pressure, so that higher static pressure is created there. The difference between the static pressures which prevail respectively in the radially outermost region and in the radially innermost region of the baffle space can thus from time to time force the baffles into the bucket wheel gap against the force produced by the adjustment cylinder to maintain the baffles in their disengaged state.

At first it was attempted to solve the problem by withdrawing the baffles further outward when the brake was engaged. However, this would necessitate enlarging the displacement path, and possibly also increasing the external dimensions of the brake. For this reason, pressure venting of the radially outermost region of the baffle-accommodating space was considered. This solution meant providing a connection line from the baffle space to a zone at lower pressure outside the brake housing. However, if this were done, it would then be necessary to conduct the quantity of working fluid escaping via such a venting line back into the working chamber.

SUMMARY OF THE INVENTION

It is one object of the invention to provide a hydrodynamic brake of the kind described above in which the flow obstruction baffles are prevented from being accidentally engaged.

It is another object of the invention to realize the foregoing object without increasing the size of the brake.

According to the invention, a duct connection is provided between the accommodating space for the flow obstruction baffles and the annular outlet duct. The venting line commences from the radially outermost region of the baffle-accommodating space. Moreover, it is advantageous to return the quantity of working fluid escaping through the venting line into the circuit, in the flow direction, upstream of the outlet regulating valve. In this way, the quantity of escaping working fluid is also detected by the outlet regulator, and the quantity of working fluid leaving the working chamber directly through the rotor bucket wheel is correspondingly reduced as a result. This advantageous behavior of the brake of the invention is particularly important in the low rotational speed range. At low rotational speeds, the working chamber must be completely filled to obtain the highest possible braking force, which is achieved by closing the outlet valve.

The invention, wherein a duct connection (or "venting line") is provided between the radially outermost region of the baffle-accommodating space and the annular outlet duct, was not at first considered viable, as it was not thought that the pressure difference between the baffle-accommodating space and the annular outlet duct would be sufficient to have the desired effect. However, it was then surprisingly found that this solution was in fact successful.

Other objects and features of the invention will be apparent from the following description and the accompanying drawings.

DETAILED DESCRIPTION OF THE PREFERRED EMBODIMENTS

Figure 1:
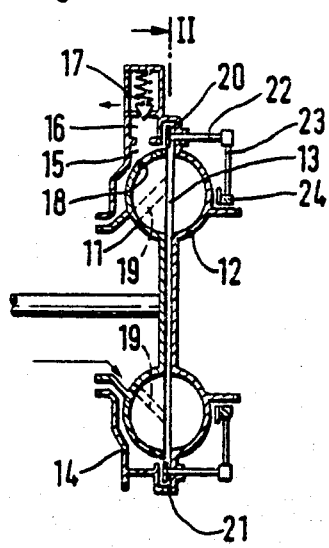
FIG. 1 is a simplified schematic illustration of the hydrodynamic brake of the present invention, in longitudinal section.
Figure 2:
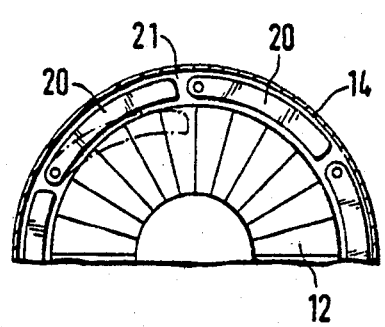
FIG. 2 is a partial cross-section taken along the line II in FIG. 1.

In FIGS. 1 and 2, the rotor bucket wheel 11 and stator bucket wheel 12 are disposed in casing 14 in a confronting relationship and defining a torus-shaped working chamber. A narrow bucket wheel gap 13 is left between the rotor 11 and stator 12. The stator bucket wheel 12 is secured to casing 14. The casing 14 also encloses the rotor bucket wheel 11. An annular outlet duct 15 is defined by the casing 14 and the rotor 11, surrounding the circumference of the rotor and being coaxial with it. There is an outlet regulating valve 17 in casing 14. The valve 17 is located in an outlet line 16, which separates it from the annular outlet duct 15. The valve 17 serves as an overflow valve. It may, if desired, be equipped with a regulating device (not shown) such as that disclosed in German patent application No. P 28 55 654.9-21, corresponding to U.S. Pat. No. 4,276,970, the disclosure of which is incorporated herein by reference.

The rotor bucket wheel 11 is provided with a plurality of apertures 18 through which the working chamber defined by the rotor 11 and the stator 12 communicates with the annular outlet duct 15. The rotor bucket wheel 11 is also provided with a plurality of inlet ducts 19 for admitting working fluid into the working chamber.

Figure 3:
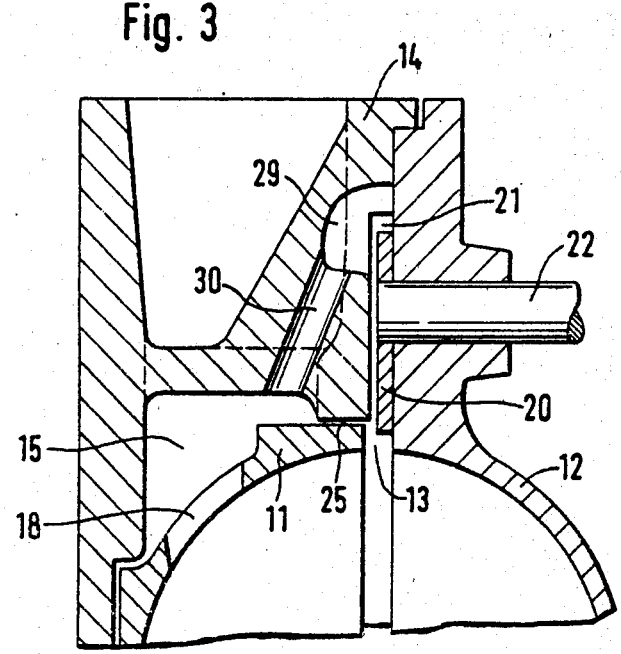
FIG. 3 is a partial longitudinal section of the brake of FIG. 1, on a larger scale than FIG. 1.

The casing 14 defines an annular space 21 concentric with and surrounding the perimeter of the bucket wheel gap 13. This space 21 accommodates a plurality of baffle type flow obstructions 20 which are distributed equiangularly about the circumference of the bucket wheel gap 13. Each baffle 20 is pivotally mounted at one end to casing 14 as shown in FIG. 2. For each baffle 20, there is a respective adjustment bolt 22. One end of each adjustment bolt 22 is secured to its respective baffle 20 perpendicular to the latter, as shown in FIG. 3. The bolt 22 extends through the casing 14 and is secured at its opposite end to a respective adjustment lever 23. The adjustment levers are secured to an adjustment ring 24 which is coaxial with the rotor 11 and the stator 12. A pressure medium adjustment cylinder of a known type (not shown) is provided to displace the adjustment ring 24 circumferentially about its axis for moving the ends of the adjustment levers 23 secured to the ring 24. This motion of the adjustment levers 23 rotates the adjustment bolts 22 about their respective axes, which rotates the baffles 20 from one position to another, as indicated by the dashed lines in FIG. 2.

The baffles are shown in FIG. 2 in their disengaged position. However, the dashed lines show one of the baffles 20 in its engaged position. The engaged position is assumed by all the baffles 20 when the brake is switched off and is thus filled only with air. The baffle-type flow obstructions 20 then reduce the ventilation losses in a known way.

Between the greatest external diameter of the rotor bucket wheel 11 and the casing 14, a relatively narrow gap 25 is provided, which acts to a certain extent as a seal between the bucket wheel gap 13 and the annular outlet duct 15.

In the radially outermost region of the baffle-accommodating space 21 a high static pressure arises from time to time. In order to reduce this static pressure, local cut-outs 29 are provided at a few points in the baffle accommodating space 21, distributed evenly around the circumference thereof. Each cut-out 29 is connected to the annular outlet duct 15 via a venting line 30. In this way, unintentional engagement of the baffles 20 in the working chamber of the brake is prevented.

The present invention may be embodied in other specific forms without departing from the spirit or essential attributes thereof, and, accordingly, reference should be made to the appended claims, rather than to the foregoing specification, as indicating the scope of the invention.

What is claimed is:

1. A hydrodynamic brake, comprising:
    a casing;
    a rotor bucket wheel;
    a stator bucket wheel forming part of said casing;
    said rotor bucket wheel and said stator bucket wheel cooperating to define a torus-shaped working chamber that can be filled with working fluid; said rotor bucket wheel and said stator bucket wheel further defining a bucket wheel gap between them; said casing having an outlet duct surrounding the outer circumference of and coaxial with said rotor bucket wheel; apertures connecting said working chamber and said outlet duct; said casing further including an annular, radially extending space coaxial with said bucket wheels and surrounding the perimeter of said bucket wheel gap; said radially extending space having a radially outermost, unobstructed, fluid containable region;
    a plurality of baffle type flow obstruction means disposed in said radially extending space; said radially outermost region of said radially extending space being located radially outward of said flow obstruction means; said obstruction means being adapted to be moved into said bucket wheel gap at least a portion of the time when the brake is not engaged and being movable out of said bucket wheel gap into said radially extending space when the brake is engaged;
    said rotor bucket wheel having an external diameter, a portion of said rotor bucket wheel which defines said external diameter cooperating with said casing to form an annular, axially extending gap communicating between said bucket wheel gap and said outlet duct, and said axially extending gap being sufficiently narrow to define a flow controlling seal between said bucket wheel gap and said outlet duct; and
    said casing further including a second open duct separate from said axially extending gap which connects said radially outermost region of said radially extending space to said outlet duct for venting to said outlet duct pressure in said radially outermost region of said radially extending space.

2. The hydrodynamic brake of claim 1, further comprising an outlet regulating valve connecting said outlet duct with the exterior of the hydrodynamic brake and wherein said second duct is connected to said outlet duct at a location that is upstream of said outlet regulating valve when the hydrodynamic brake is engaged.

3. The hydrodynamic brake of claim 1, wherein said plurality of flow obstruction means comprise a series of baffles, each being supported in said space, and a respective shaft for each said baffle at said space, said baffle being pivotable about its said shaft for swinging through a radially oriented arc.

* * * * *